(12) United States Patent
Chaduc et al.

(10) Patent No.: US 12,552,887 B2
(45) Date of Patent: Feb. 17, 2026

(54) AQUEOUS LATEX OF VINYLIDENE CHLORIDE COPOLYMER

(71) Applicant: SYENSQO SA, Brussels (BE)

(72) Inventors: Isabelle Chaduc, Milan (IT); Jérôme Vinas, Brussels (BE)

(73) Assignee: SYENSQO SA, Brussels (BE)

( * ) Notice: Subject to any disclaimer, the term of this patent is extended or adjusted under 35 U.S.C. 154(b) by 838 days.

(21) Appl. No.: 17/787,921

(22) PCT Filed: Dec. 17, 2020

(86) PCT No.: PCT/EP2020/086656
§ 371 (c)(1),
(2) Date: Jun. 21, 2022

(87) PCT Pub. No.: WO2021/122903
PCT Pub. Date: Jun. 24, 2021

(65) Prior Publication Data
US 2023/0026244 A1    Jan. 26, 2023

(30) Foreign Application Priority Data
Dec. 20, 2019 (EP) .................... 19315171

(51) Int. Cl.
*C08F 214/10* (2006.01)
*C08F 2/24* (2006.01)
*C08F 220/04* (2006.01)

(52) U.S. Cl.
CPC .............. *C08F 214/10* (2013.01); *C08F 2/24* (2013.01); *C08F 220/04* (2013.01)

(58) Field of Classification Search
CPC ........ C08F 214/10; C08F 2/24; C08F 220/04; C08F 2/26; C08F 4/30; C08F 214/08; C08F 265/04; C08F 220/14; C08F 220/42; C08F 220/585; C08J 2367/02; C08J 2427/08; C08J 7/0427; B65D 65/42; C09D 127/08
See application file for complete search history.

(56) References Cited

U.S. PATENT DOCUMENTS

| 4,401,788 A * | 8/1983 | Hiyoshi ................ C08F 214/08 524/836 |
| 2011/0060071 A1* | 3/2011 | Vanderveken .......... B32B 27/22 524/114 |

FOREIGN PATENT DOCUMENTS

| CN | 108047833 A | 5/2018 |
| JP | 2000248493 A * | 9/2000 |
| JP | 2001342317 A * | 12/2001 |
| WO | 2013092587 A1 | 6/2013 |

OTHER PUBLICATIONS

Machine translation of JP_2001342317 (Year: 2001).*
Machine translation of JP 2000 248493 (Year: 2000).*
International Search Report issued in corresponding International Application No. PCT/EP2020/086656; mailed Mar. 31, 2021 (3 pages).
Written Opinion of the International Searching Authority issued in corresponding International Application No. PCT/EP2020/086656; dated Mar. 31, 2021 (6 pages).

* cited by examiner

*Primary Examiner* — Doris L Lee
(74) *Attorney, Agent, or Firm* — Osha Bergman Watanabe & Burton LLP

(57) ABSTRACT

An aqueous latex [latex (L)] of a vinylidene chloride copolymer [copolymer (A)], wherein the copolymer (A) consists essentially of
  recurring units derived from vinylidene chloride (VDC) in an amount comprised between 89.0 and 91.0 wt % of the copolymer,
  recurring units derived from methacrylonitrile (MAN) in an amount comprised between 2.00 and 5.50 wt % of the copolymer,
  recurring units derived from at least one ionic comonomer (ICO) in an amount comprised between 0.5 and 1.4 wt % of the copolymer (A), and
  recurring units derived from methylmethacrylate (MMA) in an amount such that the total of recurring units of VDC, MAN, ICO and MMA is 100 wt %,
and wherein the latex (L) comprises at least one surfactant [surfactant (S)] in an amount comprised between 0.09 and 1.50 wt % of the copolymer (A).
Process for the manufacture of the aqueous latex (L), film made therefrom and retort pouch prepared with such film.

20 Claims, No Drawings

AQUEOUS LATEX OF VINYLIDENE CHLORIDE COPOLYMER

This application is a national stage entry under 35 U.S.C. § 371 of International Application No. PCT/EP2020/086656 filed 17 Dec. 2020, which claims priority to European Patent application Ser. No. 19/315,171.9 filed on 20 Dec. 2019. The entire contents of these applications are explicitly incorporated herein by this reference.

The present invention relates to an aqueous latex of a vinylidene chloride copolymer, a process for the manufacture of such latex, film made therefrom and retort pouch prepared with such film.

One of the main application of the aqueous latexes of vinylidene chloride copolymer (PVDC) is the preparation of films for food packagings thanks to which appropriate water vapor permeability and oxygen permeability are reached.

Pasteurization and sterilisation are often used to enhance food preservation. These processes involve the use of water or steam and often lead to the disappointing observation of a whitening during pasteurisation or sterilisation of a packaging containing a PVDC film.

There remains therefore a need to provide aqueous PVDC latexes which can lead to the preparation of films which present less whitening after pasteurization or sterilisation. It is also important that these films remain characterized by appropriate water vapor permeability and oxygen permeability to provide suffisant level of food protection.

One subject of the present invention is therefore an aqueous latex of a vinylidene chloride copolymer which do not present the disadvantages of the latexes of the prior art, while retaining their advantages.

Firstly, one subject of the present invention is an aqueous latex [latex (L)] of a vinylidene chloride copolymer [copolymer (A)], wherein the copolymer (A) consists essentially of
- recurring units derived from vinylidene chloride (VDC) in an amount comprised between 89.0 and 91.0 wt % of the copolymer,
- recurring units derived from methacrylonitrile (MAN) in an amount comprised between 2.00 and 5.50 wt % of the copolymer,
- recurring units derived from at least one ionic comonomer (ICO) in an amount comprised between 0.5 and 1.4 wt % of the copolymer (A), and
- recurring units derived from methylmethacrylate (MMA) in an amount such that the total of recurring units of VDC, MAN, ICO and MMA is 100 wt %;

and wherein the latex (L) comprises at least one surfactant [surfactant (S)] in an amount comprised between 0.09 and 1.50 wt % of the copolymer (A).

For the purpose of the present invention, the expression "an aqueous latex [latex (L)] of a vinylidene chloride copolymer [copolymer (A)]" is to be understood to mean an aqueous dispersion of the copolymer (A) in water.

For the purpose of the present invention, the term "consisting essentially of" the recurring units mentioned above is to be understood to mean that any additional recurring units different from the recurring units as above detailed, may be present in the copolymer (A) in amount of advantageously at most 1 mol %, preferably at most 0.5 mol % and most preferably at most 0.25 mol %, relative to the total number of moles of recurring units in the copolymer (A), and so as not to substantially alter the advantageous properties of the copolymer (A).

When present in the copolymer (A), the additional recurring units can be the recurring units of (meth)acrylic monomers other than MAN and MMA, corresponding to the general formula:

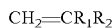

$CH_2=CR_1R_2$ in which $R_1$ is chosen from hydrogen and the methyl radical and $R_2$ is chosen from the —CN radical and the —CO—$R_3$ radical in which $R_3$ is chosen from the —OH radical, the —O—$R_4$ radicals with $R_4$ chosen from the linear or branched alkyl radicals containing from 2 to 18 carbon atoms optionally bearing one or more —OH radicals, the epoxyalkyl radicals containing from 2 to 10 carbon atoms and the alkoxyalkyl radicals containing a total of 2 to 10 carbon atoms and finally $R_3$ is also chosen from the —$NR_5R_6$ radicals in which $R_5$ and $R_6$, which are the same or different, are chosen from hydrogen and the alkyl radicals containing from 1 to 10 carbon atoms, optionally bearing one or more —OH radicals.

Preferably, when present in the copolymer (A), the additional recurring units are those of methyl acrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, acrylic acid, methacrylic acid, acrylamide and N-methylolacrylamide.

More preferably, when present in the copolymer (A), the additional recurring units are those of acrylonitrile, acrylic acid or n-butyl acrylate.

The copolymer (A) consists essentially of, notably, recurring units derived from vinylidene chloride (VDC) in an amount comprised between 89.0 and 91.0 wt % of the copolymer (A).

The copolymer (A) consists essentially of, notably, recurring units derived from vinylidene chloride (VDC) in an amount of at least 89.0 wt %; preferably of at least 89.2 wt 00 more preferably of at least 89.5 wt % and most preferably of at least 90.0 wt 00 of the copolymer (A).

The copolymer (A) consists essentially of, notably, recurring units derived from vinylidene chloride (VDC) in an amount of at most 91.0 wt %, preferably of at most 90.8 wt % and more preferably of at most 90.6 wt %, of the copolymer (A).

The copolymer (A) consists essentially of, notably, recurring units derived from methacrylonitrile (MAN) in an amount comprised between 2.00 and 5.50 wt % of the copolymer of the copolymer (A).

The copolymer (A) consists essentially of, notably, recurring units derived from methacrylonitrile (MAN) in an amount of at least 2.00 wt %; preferably of at least 2.20 wt 00 more preferably of at least 2.50 wt %, and most preferably of at least 2.80 wt 00 of the copolymer (A).

The copolymer (A) consists essentially of, notably, recurring units derived from methacrylonitrile (MAN) in an amount of at most 5.50 wt %, preferably of at most 5.25 wt %, more preferably of at most 5.00 wt %, of the copolymer (A).

The copolymer (A) consists essentially of, notably, recurring units derived from at least one ionic comonomer (ICO).

By "at least", it is meant according to the present invention, that the copolymer (A) consists essentially of, notably, recurring units derived from one or more than one ionic comonomer (ICO). Preferably, the copolymer (A) consists essentially of, notably, recurring units derived from one ionic comonomer (ICO).

The ionic comonomer (ICO) is advantageously selected from 2-acrylamido-2-methyl-1-propane sulfonic acid sodium salt, sodium 2-sulfoethyl methacrylate, sodium 4-vinylbenzenesulfonate (also called styrene-4-sulfonic acid sodium salt) and mixtures thereof.

The ionic comonomer (ICO) is preferably selected from 2-acrylamido-2-methylpropane sulfonic acid sodium salt, sodium 4-vinylbenzenesulfonate (also called styrene-4-sulfonic acid sodium salt) and mixtures thereof.

The ionic comonomer (ICO) is more preferably selected from 2-acrylamido-2-methylpropane sulfonic acid sodium salt and sodium 4-vinylbenzenesulfonate (also called styrene-4-sulfonic acid sodium salt).

When the latex (L) is used to prepare films or retort pouches used for food packaging which is submitted to pasteurization, latex (L) of copolymer (A) which consists essentially of, notably, recurring units derived 2-acrylamido-2-methylpropane sulfonic acid sodium salt, is more particularly prefered.

When the latex (L) is used to prepare or retort pouches used for food packaging which is submitted to sterilization, latex (L) of copolymer (A) which consists essentially of, notably, recurring units derived from an ionic comonomer selected from 2-acrylamido-2-methylpropane sulfonic acid sodium salt and sodium 4-vinylbenzenesulfonate (also called styrene-4-sulfonic acid sodium salt), is more particularly prefered.

The copolymer (A) consists essentially of, notably, recurring units derived from at least one ionic comonomer (ICO) in an amount comprised between 0.5 and 1.4 wt % of the copolymer (A).

The copolymer (A) consists essentially of, notably, recurring units derived from at least one ionic comonomer (ICO) in an amount of at least 0.5 wt %; preferably of at least 0.6 wt 00 more preferably of at least 0.7 wt %, most preferably of at most 0.8 wt %, of the copolymer (A).

The copolymer (A) consists essentially of, notably, recurring units derived from at least one ionic comonomer (ICO) in an amount of at most 1.4 wt %, preferably of at most 1.2 wt % and more preferably of at most 1.1 wt %, of the copolymer (A).

The copolymer (A) consists essentially of, notably, recurring units derived from methylmethacrylate (MMA) in an amount such that the total of recurring units of VDC, MAN, ICO and MMA is 100 wt %.

The latex (L) comprises at least one surfactant [surfactant (S)] in an amount comprised between 0.09 and 1.50 wt % of the copolymer (A).

By "at least one surfactant (S)", it is meant that the latex can comprise one or more than one surfactants (S).

In the remainder of the text, the expression "surfactant (S)" used in the singular or plural should be understood as denoting one or more than one surfactants (S), except where denoted otherwise.

The surfactants (S) may be anionic surfactants or non-ionic surfactants.

Among the anionic surfactants, mention may be made, non-limitingly, of alkyl sulfates such as sodium lauryl sulfate; alkyl sulfonates such as sodium n-alkyl-($C_{10}$-$C_{13}$) benzene sulfonate and sodium 1-hexadecane sulfonate in pure form or in the form of a mixture of $C_{12}$-$C_{20}$ alkyl sulfonates sometimes known as paraffin sulfonates; alkylaryl monosulfonates or disulfonates; alkylaryloxide disulfonate such as sodium branched alkyl-($C_{12}$) diphenyloxide disulfonate; and dialkyl sulfosuccinates such as sodium diethylhexyl sulfosuccinate and sodium dihexyl sulfosuccinate.

Among the non-ionic surfactants, mention may be made, non-limitingly, of alkyl ethoxylated or alkylaryl ethoxylated derivatives, alkyl propoxylated or alkylaryl propoxylated derivatives, and sugar esters or ethers.

The surfactants (S) are preferably anionic surfactants, optionally as a mixture with one or more non-ionic surfactants. Anionic surfactants are particularly preferred.

The latex (L) comprises at least one surfactant [surfactant (S)] in an amount of at least 0.09 wt %; preferably of at least 0.10 wt %, more preferably of at least 0.12 wt %, particularly more preferably of at least 0.15 wt %, most preferably of at least 0.17 wt % and particularly most preferably of at least 0.20 wt %, of the copolymer (A).

The latex (L) comprises at least one surfactant [surfactant (S)] in an amount of at most 1.50 wt %; preferably of at most 1.40 wt %, more preferably of at most 1.30 wt %, particularly more preferably of at most 1.20 wt %, most preferably of at most 1.10 wt % and particularly most preferably of at most 1.00 wt %, of the copolymer (A).

The latex (L) comprises advantageously two surfactants, preferably two anionic surfactants, more preferably an alkyl sulfonate and an alkylaryloxide disulfonate, most preferably sodium n-alkyl-($C_{10}$-$C_{13}$) benzene sulfonate and sodium branched alkyl-($C_{12}$) diphenyloxide disulfonate.

Firstly, one subject of the present invention is an aqueous latex [latex (L)] of a vinylidene chloride copolymer [copolymer (A)], wherein the copolymer (A) consists essentially of recurring units derived from vinylidene chloride (VDC) in an amount comprised between 89.2 and 90.8 wt % of the copolymer, recurring units derived from methacrylonitrile (MAN) in an amount comprised between 2.20 and 5.25 wt % of the copolymer, recurring units derived from at least one ionic comonomer (ICO) in an amount comprised between 0.6 and 1.2 wt % of the copolymer (A), and recurring units derived from methylmethacrylate (MMA) in an amount such that the total of recurring units of VDC, MAN, ICO and MMA is 100 wt %;

and wherein the latex (L) comprises at least one surfactant [surfactant (S)] in an amount comprised between 0.10 and 1.40 wt % of the copolymer (A).

The aqueous latex [latex (L)] of a vinylidene chloride copolymer [copolymer (A)] according to the invention is advantageously such that the copolymer (A) consists of recurring units derived from vinylidene chloride (VDC) in an amount comprised between 89.0 and 91.0 wt % of the copolymer, recurring units derived from methacrylonitrile (MAN) in an amount comprised between 2.00 and 5.50 wt % of the copolymer, recurring units derived from at least one ionic comonomer (ICO) in an amount comprised between 0.5 and 1.4 wt % of the copolymer (A), and recurring units derived from methylmethacrylate (MMA) in an amount such that the total of recurring units of VDC, MAN, ICO and MMA is 100 wt %;

and wherein the latex (L) comprises at least one surfactant [surfactant (S)] in an amount comprised between 0.09 and 1.50 wt % of the copolymer (A).

For the purpose of the present invention, the term "consisting of" the recurring units mentioned above is to be understood to mean that no additional recurring units different from the recurring units as above detailed, may be present in the copolymer (A).

The preferences defined above when the copolymer (A) consists essentially of the recurring units defined above, apply also when the copolymer (A) consists of the recurring units defined above.

The aqueous latex [latex (L)] according to the invention is characterized by a solid content advantageously of at least 40 wt % and preferably of at least 42 wt %. The aqueous latex [latex (L)] is characterized by a solid content advantageously of at most 50 wt % and preferably of at most 48 wt %. The aqueous latex [latex (L)] according to the invention is characterized by a solid content more preferably between 44 and 46 wt %.

The individual polymer particles in the aqueous latex [latex (L)] have a z-average particle diameter (D), measured by Dynamic Light Scattering (DLS) as described in the experimental part, advantageously of at least 120 nm, preferably of at least 130 nm and more preferably of at least 140 nm. They have average diameters advantageously of at most 300 nm, preferably of at most 200 nm and more preferably of at most 160 nm.

The aqueous latex [latex (L)] according to the invention is characterized by a surface tension, measured by the Wilhelmy plate method as described in the experimental part, advantageously of at least 48 mN/m, preferably of at least 49 mN/M and more preferably of at least 50 mN/m. They have a surface tension advantageously of at most 65 mN/m, preferably of at most 63 mN/m, more preferably of at most 60 mN/m and most preferably of at most 55 mM/m.

Next, one subject of the present invention is a process for the manufacture of the aqueous latex [latex (L)] of a vinylidene chloride copolymer [copolymer (A)] according to the invention characterized in that VDC, MAN, at least one ICO and MMA are polymerized by radical polymerization in aqueous emulsion in the presence of at least one surfactant (S) in order to obtain the latex (L) of the copolymer (A).

The expression "radical polymerization in aqueous emulsion" is understood to mean, according to the present invention, any radical polymerization process performed in aqueous medium in the presence of at least one surfactant and at least one radical generator. This definition specifically encompasses the so-called "conventional" polymerization in aqueous emulsion in which water-soluble radical generators are used, and also polymerization in microsuspension, also called polymerization in homogenized aqueous dispersion, in which oil-soluble radical generators are used and an emulsion of monomer droplets is prepared by virtue of a powerful mechanical stirring and the presence of surfactants.

The invention is particularly suitable for the so-called "conventional" polymerization in aqueous emulsion which is carried out under the conditions known to a person skilled in the art i.e. the polymerization is carried out with the intervention of surfactants and water-soluble radical generators.

The process for the manufacture of the latex (L) according to the invention advantageously uses at least one radical generator and at least one surfactant (S).

The expression "at least one radical generator" is understood to mean, according to the present invention, that the process for the manufacture of the latex (L) may use one or more than one radical generators.

In the remainder of the text, the expression "radical generator" used in the singular or plural should be understood as denoting one or more than one radical generators, except where denoted otherwise.

The radical generators are advantageously water-soluble. The expression "water-soluble radical generators" is understood to mean, according to the present invention, the radical generators that are soluble in water.

The radical generators are advantageously chosen from water-soluble diazo compounds, water-soluble peroxides and redox systems combining a water-soluble peroxide and a reducing agent.

As examples of water-soluble diazo compounds, mention may be made of:
  2-(carbamoylazo)isobutyronitrile;
  4,4'-azobis(4-cyanovaleric acid);
  ammonium 4,4'-azobis(4-cyanovalerate);
  sodium 4,4'-azobis(4-cyanovalerate);
  potassium 4,4'-azobis(4-cyanovalerate);
  2,2'-azobis(N, N'-dimethyleneisobutyramidine);
  2,2'-azobis(N, N'-dimethyleneisobutyramidine) dihydrochloride;
  2,2'-azobis(2-amidinopropane) dihydrochloride;
  2,2'-azobis[2-methyl-N-(1,1-bis(hydroxymethyl)-2-hydroxyethyl)propionamide];
  2,2'-azobis[2-methyl-N-(1,1-bis(hydroxymethyl)ethyl) propionamide];
  2,2'-azobis[2-methyl-N-(2-hydroxyethyl)propionamide]; and
  2,2'-azobis(isobutyramide) dihydrate.
    4,4'-azobis(4-cyanovaleric acid), ammonium 4,4'-azobis(4-cyanovalerate), sodium 4,4'-azobis(4-cyanovalerate) and potassium 4,4'-azobis(4-cyanovalerate) are preferred.

As examples of water-soluble peroxides, mention may be made of:
  inorganic peroxides such as sodium, potassium and ammonium persulfates;
  tert-butyl hydroperoxide;
  hydrogen peroxide; and
  perborates.

The water-soluble peroxides are preferred. Among these, alkali metal persulfates such as sodium persulfate and potassium persulfate, ammonium persulfate and also hydrogen peroxide are particularly preferred. Alkali metal persulfates and ammonium persulfate are more particularly preferred.

As examples of water-soluble peroxides that make up the redox system, mention may be made of the aforementioned water-soluble peroxides. As reducing agents that make up the redox system, mention may be made of alkali metal sulfites, alkali metal metabisulfites, ascorbic acid and a sodium salt of an organic sulfinic acid derivative like disodium salt of 2-hydroxy-2-sulfinato-acetic acid or mixtures comprising it (as for example products BRUGGOLITE® FF7 and BRUGGOLITE® FF6M).

Preferred redox systems are the alkali metal or ammonium persulfate/alkali metal sulfite, alkali metal or ammonium persulfate/alkali metal metabisulfite, alkali metal or ammonium persulfate/ascorbic acid, alkali metal or ammonium persulfate/disodium salt of 2-hydroxy-2-sulfinato-acetic acid, hydrogen peroxide/ascorbic acid, hydrogen peroxide/ferrous sulfate, hydrogen peroxide/disodium salt of 2-hydroxy-2-sulfinato-acetic acid and t-butyl hydroperoxide/sulfoxylate systems. Sodium sulfite and sodium metabisulfite are particularly preferred among the alkali metal sulfites and metabisulfites respectively.

Particularly preferably, the process for the manufacture of the latex (L) according to the invention uses a single water-soluble radical generator. This is more particularly preferably chosen from alkali metal persulfates, ammonium persulfate, hydrogen peroxide and alkali metal or ammonium persulfate/sodium sulfite, alkali metal or ammonium persulfate/sodium metabisulfite, alkali metal or ammonium persulfate/ascorbic acid, alkali metal or ammonium persulfate/disodium salt of 2-hydroxy-2-sulfinato-acetic acid, hydrogen peroxide/disodium salt of 2-hydroxy-2-sulfinato-acetic acid and hydrogen peroxide/ascorbic acid redox systems.

An oil-soluble radical generator (soluble in the monomer (s)) may optionally be added, moreover, at the end of the polymerization.

One fraction of the radical generator(s) is preferably introduced at the start and another fraction at a later time.

When the introduction takes place at a later time, it may be carried out continuously or as a single injection.

The expression "continuous introduction" is understood to mean, according to the invention, that the introduction is carried out over a certain time period and that it is not carried out in a single injection at a given time. It is preferably carried out with a certain rate which is particularly preferably constant.

The process for the manufacture of the aqueous latex [latex (L)] according to the invention is characterized in that VDC, MAN, a least one ICO and MMA are polymerized by radical polymerization in aqueous emulsion in the presence of at least one surfactant (S).

The expression "at least one surfactant (S)" is understood to mean, according to the present invention, that the process for the manufacture of the latex (L) may use one or more than one surfactants (S).

One fraction of the surfactant(s) (S) is preferably introduced at the start and another fraction at a later time.

When the introduction takes place at a later time, it is preferably carried out continuously according to continuous introduction as defined above.

According to the process for the manufacture of the latex (L) according to the invention, the monomers (i.e. VDC, MAN, ICO and MMA) may be introduced into the polymerization medium in several different ways and in a different form.

Thus, according to a first variant, some monomers are introduced at the start in one go and the others at a later time, either in one go, or continuously.

According to a second variant, all the monomers are introduced at the start in one go.

According to a third variant, all the monomers are introduced continuously, at a later time.

According to a fourth variant, one fraction of all of the monomers is introduced at the start and the balance is introduced at a later time, either in one go, or continuously.

The monomers may be introduced individually (in the pure state or in the form of an emulsion) or after having been blended (the blend being introduced as is or in the form of an emulsion).

After reaction of the contents of the reactor, preferably by heating the contents of the reactor until the degree of conversion of the monomers is advantageously at least 82% and preferably at most 100%, latex (L) of copolymer (A) is advantageously obtained.

The temperature at which the contents of the reactor are reacted is advantageously at least 30° C. and preferably at least 40° C. In addition, it is advantageously at most 200° C. and preferably at most 120° C.

The latex obtained is then advantageously subjected to stripping of the residual monomers before its subsequent use. Stripping may be carried out by stripping under vacuum or else by stripping under vacuum and simultaneously injecting steam into the latex. Preferably, stripping is carried out by stripping under vacuum and simultaneously injecting steam into the latex.

In the process according to the invention, the polymerization takes place advantageously in the presence of a seed latex [seed latex (SL)].

The term "seed latex (SL)" is understood to denote, according to the present invention, a latex whose characteristics are such that it may be used as a base for manufacturing at least one other latex. In particular, it is advantageously characterized by the fact that it absorbs the organic phase well and that it prevents the formation of parasite particle populations.

In the process according to the invention, the polymerization takes place preferably in the presence of a methyl methacrylate polymer seed latex [PMMA seed latex].

The expression "in the presence" is understood to mean, according to the invention, that the seed latex (SL), preferably the PMMA seed latex, is in the polymerization medium when this polymerization takes place. Although it is not excluded that a small amount of the seed latex (SL), preferably of the PMMA seed latex, may be added at a later time, it is preferred that all of the seed latex (SL), preferably all of the PMMA seed latex, is present when the contents of the reactor are reacted. Particularly preferably, all of the seed latex (SL), preferably of the PMMA seed latex, is introduced at the start and is therefore present when the contents of the reactor are reacted.

The expression "at the start" is understood to mean with the initial charge.

The expression "at a later time" is understood to mean that the introduction begins after the initial charge has been introduced and the polymerization reaction initiated.

According to the process for the manufacture of the latex (L) according to the invention, the polymerization takes place in the presence advantageously of at most 3 wt %, preferably at most 2.5 wt %, particularly preferably at most 2 wt %, more particularly preferably at most 1.5 wt % and most particularly preferably at most 1.3 wt %, expressed relative to the total weight of the monomers (VDC, MAN, MMA and ICO), of dry matter of a seed latex (SL), preferably of a PMMA seed latex.

The seed latex (SL), preferably the PMMA seed latex, can be prepared by any process.

Advantageously, the PMMA seed latex is prepared by radical polymerization in aqueous emulsion of (a) methyl methacrylate (MMA) and optionally at least one comonomer, in the presence of (b) at least one radical generator, (c) at least one surfactant [surfactant (S')] in a total amount of at least 4 wt % relative to the total weight of (a), and (d) water which comprises the steps according to which:
  (1) at least one fraction of (b), at least 2.5 wt % of (c) relative to the total weight of (a), at least one fraction of (d) and optionally at least one fraction of (a) are introduced into a reactor; then
  (2) the contents of the reactor are reacted, while continuously introducing thereinto the balance of (a), (b), (c) and (d); and
  (3) a PMMA seed latex is obtained and isolated.

The expression "radical polymerization in aqueous emulsion" is defined above and the preferences defined above apply also for the process to prepare the PMMA seed latex.

The polymerization is preferably performed by introducing into a reactor at least one fraction of (b), at least 2.5 wt % of (c) relative to the total weight of (a), at least one fraction of (d) and optionally at least one fraction of (a), and then the contents of the reactor are reacted, while continuously introducing therein the balance of (a), (b), (c) and (d), before obtaining and isolating the PMMA seed latex.

The PMMA seed latex is characterized by a solid content advantageously of at least 25 wt %, preferably of at least 30 wt % and more preferably of at least 32 wt %. The PMMA seed latex is characterized by a solid content advantageously of at most 40 wt % and preferably of at most 35 wt %.

The PMMA seed latex is characterized by a solid content more preferably between 32 and 35 wt %.

The individual polymer particles in the PMMA seed latex have a z-average particle diameter ($D_z$), measured by Dynamic Light Scattering (DLS) as described in the experimental part, advantageously of at least 25 nm, preferably of at least 28 nm and more preferably of at least 30 nm. They have average diameters advantageously of at most 42 nm, preferably of at most 40 nm and more preferably of at most 38 nm.

The expression "methyl methacrylate polymers or PMMA" is understood to denote both the homopolymers of methyl methacrylate (MMA) and the copolymers that it forms as the main monomer with at least one comonomer which is copolymerizable with MMA.

The expression "main monomer" for MMA polymers is understood to denote the monomer present in an amount of at least 100/n wt % of the monomer blend and which will create at least 100/n wt % of the monomer units of the polymer obtained, n denoting the number of monomers of the monomers blend.

Particularly preferred MMA copolymers are those containing MMA in an amount of at least 100/n wt % and, as copolymerizable monomers, vinyl chloride, vinylidene chloride and/or (meth)acrylic monomers corresponding to the general formula:

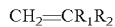

in which $R_1$ is chosen from hydrogen and the methyl radical and $R_2$ is chosen from the —CN radical and the —CO—$R_3$ radical in which $R_3$ is chosen from the —OH radical, the —O—$R_4$ radicals with $R_4$ chosen from the linear or branched alkyl radicals containing from 2 to 18 carbon atoms optionally bearing one or more —OH radicals, the epoxyalkyl radicals containing from 2 to 10 carbon atoms and the alkoxyalkyl radicals containing a total of 2 to 10 carbon atoms and finally $R_3$ is also chosen from the —$NR_5R_6$ radicals in which $R_5$ and $R_6$, which are the same or different, are chosen from hydrogen and the alkyl radicals containing from 1 to 10 carbon atoms, optionally bearing one or more —OH radicals.

More particularly preferred MMA copolymers are those containing, as copolymerizable monomers, vinyl chloride, vinylidene chloride and/or (meth)acrylic monomers that are methyl acrylate, ethyl acrylate, ethyl methacrylate, n-butyl acrylate, n-butyl methacrylate, 2-ethylhexyl acrylate, 2-ethylhexyl methacrylate, 2-hydroxyethyl acrylate, 2-hydroxyethyl methacrylate, glycidyl methacrylate, glycidyl acrylate, acrylonitrile, methacrylonitrile, acrylic acid, methacrylic acid, acrylamide and N-methylolacrylamide.

A comonomer copolymerizable with MMA is preferably not used. The process for the preparation of the PMMA seed latex by radical polymerization in aqueous emulsion is therefore preferably such that (a) methyl methacrylate is used. The PMMA seed latex is therefore preferably a seed latex of an MMA homopolymer.

According to step (1) of the process for preparing a PMMA seed latex, optionally at least one fraction of (a) is introduced into a reactor.

When at least one fraction of (a) is introduced in step (1), preferably at least 1%, particularly preferably at least 2.5%, more particularly preferably at least 5% and most particularly preferably at least 8% of all, by weight, of (a) are introduced in step (1).

When at least one fraction of (a) is introduced in step (1), preferably at most 30%, particularly preferably at most 25%, more particularly preferably at most 20% and most particularly preferably at most 15% of all, by weight, of (a) are introduced in step (1).

Good results have been obtained without introducing a fraction of (a) in step (1), but by introducing all of (a) continuously in step (2), or by introducing around 10% of all, by weight, of (a) in step (1) and the balance in step (2).

The process for preparing a PMMA seed latex uses advantageously at least one radical generator.

The expression "at least one radical generator" is understood to mean that the process for preparing a PMMA seed latex may use one or more than one radical generators.

Preferably, a single radical generator is used. In the remainder of the text, the expression "radical generator" used in the singular or plural should be understood as denoting one or more radical generators, except where denoted otherwise.

The radical generators are advantageously water-soluble, as defined above.

The radical generators are advantageously chosen from water-soluble diazo compounds and water-soluble peroxides. Examples of water-soluble diazo compounds and of water-soluble peroxides are given above.

The water-soluble peroxides are preferred. Among these, alkali metal persulfates such as sodium persulfate and potassium persulfate, ammonium persulfate and also hydrogen peroxide are particularly preferred. Alkali metal persulfates and ammonium persulfate are more particularly preferred.

In a particularly preferred manner, the process for the preparation of the PMMA seed latex by radical polymerization in aqueous emulsion uses a single radical generator (b) and this is chosen from alkali metal persulfates and ammonium persulfate.

According to step (1) of the process for preparing a PMMA seed latex, at least one fraction of (b) is introduced into a reactor.

Preferably at least 50%, particularly preferably at least 60%, more particularly preferably at least 65% and most particularly preferably at least 70% of all, by weight, of (b) are introduced in step (1).

The process for preparing a PMMA seed latex advantageously uses (c) at least one surfactant (S') in a total amount of at least 4 wt % relative to the total weight of (a).

The expression "at least one surfactant (S')" is understood to mean that the process for preparing a PMMA seed latex may use one or more than one surfactants (S').

Preferably, a single surfactant (S') is used. In the remainder of the text, the expression "surfactant (S')" used in the singular or plural should be understood as denoting one or more than one surfactants (S'), except where denoted otherwise.

The surfactants (S') may be anionic surfactants or non-ionic surfactants. Examples of anionic surfactants and of non-ionic surfactants are the same as the ones given above for surfactant (S).

The surfactant (S') is preferably an anionic surfactant, optionally as a mixture with one or more than one non-ionic surfactants. The surfactant (S') is more preferably an anionic surfactant.

The process for preparing a PMMA seed latex uses a total amount advantageously of at least 4 wt %, preferably of at least 5 wt %, more preferably of at least 7 wt % and most preferably of at least 8 wt %, relative to the total weight of (a), of at least one surfactant (S'), preferably of a single surfactant (S').

The process for preparing a PMMA seed latex uses a total amount advantageously of at most 20 wt %, preferably of at most 15 wt % and most preferably of at most 12 wt %, relative to the total weight of (a), of at least one surfactant (S'), preferably of a single surfactant (S').

According to step (1) of the process for preparing a PMMA seed latex, at least 2.5 wt % of (c) relative to the total weight of (a) is introduced into a reactor.

Preferably at least 3 wt %, more preferably at least 5 wt % and most preferably at least 7 wt % of (c) relative to the total weight of (a) is introduced in step (1).

Preferably at most 20 wt %, more preferably at most 15 wt % and most preferably at most 12 wt % of (c) relative to the total weight of (a) is introduced in step (1).

Preferably at most 5 wt % and more preferably at most 2.5 wt % of (c) relative to the total weight of (a) is introduced in step (2).

Good results have been obtained by introducing all of (c), preferably around 10 wt % of (c) relative to the total weight of (a), in step (1), or by introducing around 8 wt of (c) relative to the total weight of (a) in step (1) and around 2 wt 00 of (c) relative to the total weight of (a) in step (2).

According to step (1) of the process for preparing the PMMA seed latex, at least one fraction of (d) is introduced into a reactor.

Preferably at least 70% of all, by weight, of (d), more preferably at least 75% of all, by weight, of (d) and most preferably at least 80% of all, by weight, of (d) are introduced in step (1).

Therefore, during step (1), advantageously no reaction occurs.

According to step (2) of the process for preparing a PMMA seed latex, the contents of the reactor are reacted.

The expression "the contents of the reactor are reacted" is understood to mean that it is in step (2) that the polymerization reaction is initiated.

In order to make the contents of the reactor react according to step (2), means are used by which radicals are generated within it. For this purpose, it is especially possible to heat the contents of the reactor or to expose it to an intense light radiation like for example UV or visible light. Preferably, the contents of the reactor are heated.

The temperature at which the contents of the reactor are reacted is advantageously at least 30° C. and preferably at least 40° C. In addition, it is advantageously at most 200° C. and preferably at most 120° C.

The process for preparing the PMMA seed latex is advantageously a continuous process. The expression "continuous process" is understood to mean that at least one fraction of one of (a), (b), (c) or (d) is introduced during step (2), contrary to a batch or discontinuous process according to which all of (a), (b), (c) and (d) would be introduced in step (1).

According to step (2), the contents of the reactor are reacted while continuously introducing thereinto the balance of (a), (b), (c) and (d). The expression "continuous introduction" is defined above.

The balance of (a), (b), (c) and (d) may be introduced independently or as a mixture. Preferably, the balance of (a), (c) and (d) is introduced as a mixture and the balance of (b) separately from this mixture.

The process for preparing a PMMA seed latex preferably takes place in the absence of a viscosity reducer, such as for example an ionic electrolyte.

Advantageously, step (2) is continued until the MMA and optionally the other comonomer or comonomers have reacted to a certain extent. Preferably, step (2) is continued until the degree of conversion of the MMA and optionally of the other comonomer or comonomers is at least 82% and at most 100%.

According to step (3) of the process for preparing a PMMA seed latex, a methyl methacrylate polymer seed latex is obtained and isolated.

According to step (3), the PMMA seed latex is therefore isolated from the reactor in which it was prepared. The process for preparing a PMMA seed latex is therefore advantageously an ex situ process, that is to say a process at the end of which the seed latex is isolated, contrary to an in situ process according to which the seed latex is synthesized in the reactor where it is then used for a subsequent polymerization.

The PMMA seed latex may or may not then be subjected to stripping of the residual monomers before its subsequent use. In the case where stripping is carried out, it may be by stripping under vacuum or else by stripping under vacuum and simultaneously injecting steam into the latex. Preferably, when it is carried out, it is by stripping under vacuum.

According to one particularly preferred variant, the process for preparing a PMMA seed latex is characterized in that it comprises the steps according to which:

(1) at least one fraction of (b), at least 7 wt % of (c) relative to the total weight of (a), at least 80% of all, by weight, of (d) and at most 15% of all, by weight, of (a) are introduced into a reactor; then (2) the contents of the reactor are reacted, while continuously introducing thereinto the balance of (a), (b), (c) and (d); and (3) a PMMA seed latex is obtained and isolated.

The aqueous latex [latex (L)] of a vinylidene chloride copolymer [copolymer (A)] according to the invention is advantageously applied as a coating on a substrate to produce a multilayer film.

Another object of the present invention is therefore the use of the aqueous latex [latex (L)] of a vinylidene chloride copolymer [copolymer (A)] according to the invention as a coating on a substrate to produce a multilayer film, preferably used for food packaging.

Any process can be used to coat the aqueous latex (L) on the substrate.

Non-limitative examples of coating processes are air knife coating and engraved roller coating.

The substrate can be a polymeric substrate, a paper substrate or a regenerated cellulose substrate. The substrate is preferably a polymeric substrate.

The polymeric substrates which can be coated with the latex (L) according to the invention are for example polyvinyl chloride, polyesters (preferably polyethylene terephthalate), polyamides and polypropylene. Polyethylene terephthalate is particularly preferred as polymeric substrate.

Another object of the present invention is a film prepared with the aqueous latex [latex (L)] of a vinylidene chloride copolymer [copolymer (A)] according to the invention, preferably a film for packaging, more preferably a film for food packaging and most preferably a flexible film for food packaging.

The film according to the invention is preferably used for food packaging, more preferably for retortable food packaging. The film according to the invention is most preferably used to prepare a retort pouch.

Another object of the present invention is a retort pouch prepared with the film according to the invention.

By "retort pouches", also called "retortable pouches", it is meant according to the present invention, a type of food packaging which allows the sterile packaging of a wide variety of food and drink handled by aseptic processing, and is used as an alternative to traditional industrial canning methods.

When the film according to the invention is used to prepare a retort pouch, polyethylene terephthalate is particularly preferred as polymeric substrate.

The retort pouches are generally submitted to pasteurization or sterilization.

Should the disclosure of any patents, patent applications, and publications which are incorporated herein by reference conflict with the description of the present application to the extent that it may render a term unclear, the present description shall take precedence The invention will now be described in more detail with reference to the following examples, whose purpose is merely illustrative and not intended to limit the scope of the invention.

Measurement of the Particle Size Distribution

The z-average particle diameter ($D_z$) and the polydispersity of the PMMA seed latex and of the PVDC latexes were measured by Dynamic Light Scattering (DLS) with a Zetasizer Nano ZS (Malvern Instruments) at 20° C. Samples withdrawn from PMMA seed latex and from PVDC latexes for DLS measurements were highly diluted with deionised water (diluted approximatively to 1000 times) in order to avoid interferences between the particles that may happen at high concentration.

Surface Tension

The surface tension of the PVDC latexes was measured at 20° C. by the Wilhelmy plate method (Kruss device).

Measurement of pH

The pH of the PVDC latexes was measured with a pH-meter.

Production of Films with the PVDC Latexes

Films were produced with the PVDC latexes. In order to do this, a corona treatment was first applied on a PET film. One layer of about 5 μm thick of PVDC was coated on and after drying, the film was rewound.

This coating was carried out on a Kroenert line with the following characteristics:
 line speed: 100 m/min;
 corona treatment: 1.5 kW;
 "reverse" rotation (110%) of the etched roll;
 drying temperature=110° C.

The thickness of layer M of the film was measured before carrying out the measurement of the water vapour transmission rate and of the oxygen transmission rate.

After coating, the films were placed in a fridge.

Treatment of the Films Before Measurement

The films have undergone an accelerated ageing for 2 days at 40° C. and then either a sterilisation or a pasteurisation, under the conditions defined below which are standard conditions in the field.

Sterilisation took place by placing the films in a vessel containing steam at 120° C. during 30 min.

Pasteurisation took place by placing the films in a vessel immersing them in water heated at 95° C. during 2 h.

After these treatments, the films were placed in the fridge until measurement.

Before measurement, the films were removed from the fridge and placed at 23° C. and 50% relative humidity for 24 h.

Measurement of the Water Vapour Transmission Rate of the Films

The water vapour transmission rate (WVTr) of the films prepared as described above, was measured according to the standard ASTM F-1249 on a Permatran W 3/31 machine from Mocon at 38° C. and 90% relative humidity.

The water vapor transmission rate is expressed in g·μm/m²·day.

The water vapor transmission rate was measured on films having undergone an accelerated ageing for 2 days at 40° C. (2D40) and then on these films further submitted to a sterilisation (sterilized) or to a pasteurisation (pasteurized) before the measurement.

Measurement of the Oxygen Transmission Rate of the Films

The principle of the method consists in determining the amount of oxygen which passes through a film made of a vinylidene chloride copolymer latex, per unit time and unit area, for a defined temperature and relative humidity.

The machine used was an OX-TRAN 1000-H HUMIDICON (Mocon) machine, conditioned either at 23° C. and 0% relative humidity or at 230 and 85% relative humidity.

The oxygen transmission rate (OTr) is expressed in cm³·mm²·day·bar.

The oxygen transmission rate was measured on films having undergone an accelerated ageing for 2 days at 40° C. (2D40) and then on these films further submitted to a sterilisation (sterilized) or to a pasteurisation (pasteurized) before the measurement.

Measurement of Clarity and Haze

The clarity and the haze were measured in conformity with standard ASTM D 1003 applied to transparent samples with a haze value of 30% or less.

The principle is that a light beam of intensity Io passes through the sample to be analyzed having a flat surface and then enters a sphere of integration. Light uniformly distributed by the matt white coating of the sphere wall is measured by a detector.

The haze (H) is a measure of the dispersion of the light at large angles and is defined as the ratio between the light intensity transmitted by the sample, outside a solid angle of 5° (IH) and the total light intensity transmitted by the solid (IT).

The clarity is a measure of the dispersion of the light at small angles and is defined as the ratio between
 the light intensity of the circular ring of the annular sensor ($I_{center}$) (placed in the outlet orifice) subtracted from the light intensity at the center of the annular sensor ($I_{circ}$); and
 the light intensity of the circular ring of the annular sensor ($I_{center}$) added to the light intensity at the center of the annular sensor ($I_{circ}$).

The equipment used wad apparatus HAZE-GARD PLUS 4725 (Type C Illuminant) from BYK GARDNER. This device is in accordance with standard ASTM D 1003.

EXAMPLE 1 (ACCORDING TO THE INVENTION)—PREPARATION OF A PMMA SEED LATEX

An 8.7 m³ polymerization autoclave (stirred at 20 rpm), equipped with a cooling circuit, was successively charged with 3908 l of demineralized water, 14 kg (6.7 g of active material/kg of monomer) of a powdered ammonium persulfate solution and 8141 (100 g of active material/kg of monomer of the seed latex) of a sodium n-alkyl-($C_{10}$-$C_{13}$) benzene sulfonate solution containing 25% of active material. The autoclave was closed then subjected to two vacuum operations at 140 mbar absolute pressure.

The stirring speed was then increased to 60 rpm while bringing the mixture to 85° C. When the temperature reached 84° C., 2100 kg of methyl methacrylate was added at a constant rate over 3 h while adding 151 kg (2.87 g of active material/kg of monomer) of a 40 g/l ammonium persulfate solution at a constant rate over the same 3 h duration.

After the end of the methyl methacrylate and ammonium persulfate injections, the polymerization was continued until a temperature difference of less than 5° C. was obtained between the temperature of the reaction medium and that of the cooling circuit, followed by a post-polymerization of 1 h. The stirring speed was then reduced to 20 rpm and the latex was degassed then stripped under vacuum at 65° C. for 3 h.

The solid content of the PMMA seed latex thus polymerized was according to the specification i.e. 32-35%. The average diameter of the particles, determined by DLS, was according to the specification i.e. 30-38 nm.

EXAMPLE 2 (ACCORDING TO THE INVENTION)—POLYMERIZATION OF VDC IN AQUEOUS EMULSION IN THE PRESENCE OF THE PMMA SEED LATEX PREPARED IN EXAMPLE 1

A 65 l polymerization autoclave equipped with a cooling circuit was charged with 6.5 l of demineralized water. It was then charged with 793 ml of the PMMA seed latex (solid content of 32.75%) prepared according to the process as defined in Example 1 (corresponding to 11 g of dry matter/kg of monomers) and 135 ml of a 3.7 g/l ascorbic acid solution. The autoclave was subjected to two vacuum operations. The stirring speed of the medium was brought to 110 rpm. The autoclave was heated at 23° C.

A 150 l autoclave used as premixer, equipped with a cooling circuit, was successively charged with 18.3 l of demineralized water, 109 ml of a sodium branched alkyl-($C_{12}$) diphenyloxide disulfonate solution containing 486 g/l of active material, 84 ml of a sodium n-alkyl-($C_{10}$-$C_{13}$) benzene sulfonate solution containing 25% of active material. 3.49 l of a tetrasodium pyrophosphate solution at 30 g/l and 1.45 l of a 2-acrylamido-2-methylpropane sulfonic acid sodium salt solution at 180 g/l. The premixer was subjected to two vacuum operations. The stirring speed of the medium was brought to 130 rpm. A mixture of 1.45 kg of methylmethacrylate and 0.785 kg of methacrylonitrile, then 23.7 kg of vinylidene chloride were introduced in the premixer. After stirring for 30 min, the stirring rate was reduced to 90 rpm.

The temperature of the reaction medium in the autoclave was raised to 60° C. At T=59° C., 340 ml of a 71.3 g/l ammonium persulfate solution were added. The introduction of ammonium persulfate was taken as the beginning of the polymerization ($T_o$).

At $T_o$+1 min, 47.2 kg of the monomers emulsion were added from the premixer at a constant rate over 8 h. At $T_o$+1 min, 962 ml of a 11.7 g/l ascorbic acid solution were added at a constant rate over 8 h 45 min. At $T_o$+2 min, 823 ml of a 41.0 g/l ammonium persulfate solution were added at a constant rate over 8 h 15 min. When a temperature difference of 2° C. was obtained between the temperature of the reaction medium and that of the cooling circuit, the latex was post-polymerized for 120 min.

The stirring speed was reduced to 110 rpm and the latex was then hot-degassed then stripped under vacuum at 60° C. (autoclave temperature) during two hours. Then the temperature of the cooling system was brought to 60° C.

After two hours at 60° C. (cooling temperature), the stirring speed was increased to 110 rpm. After 6 h of stripping, the latex was cooled to 20° C. and then filtered through a 60 μm filtration pocket. The solid content of the latex was measured and if required adjusted, by addition of water, to be between 44 wt % and 46 wt %.

The properties of the PVDC latex obtained in Example 2 were measured in the manner described previously. The results are given in Table 1.

Films were made with the PVDC latex obtained in Example 2. The properties measured on these films in the manner described above, are given in Table 2.

EXAMPLE 3 (ACCORDING TO THE INVENTION)—POLYMERIZATION OF VDC IN AQUEOUS EMULSION IN THE PRESENCE OF THE PMMA SEED LATEX PREPARED IN EXAMPLE 1

Example 2 was reproduced except that
the quantity of a PMMA seed latex (solid content of 33.2%) prepared according to the process as defined in Example 1 was 781 ml (corresponding to 11 g of dry matter/kg of monomers);
the quantity of demineralized water introduced into the premixer was 18.0 l;
the 1.45 l of a 2-acrylamido-2-methylpropane sulfonic acid sodium salt solution at 180 g/l was replaced by 1.74 l of a styrene-4-sulfonic acid sodium salt (also called sodium 4-vinylbenzenesulfonate) solution at 150 g/l;
the quantity of methylmethacrylate was 1.44 kg; and
at To+1 min, 47.17 kg of the monomers emulsion were added from the premixer at a constant rate over 8 h.

The properties of the PVDC latex obtained in Example 3 were measured in the manner described previously. The results are given in Table 1.

Films were made with the PVDC latex obtained in Example 3. The properties measured on these films in the manner described above, are given in Table 2.

EXAMPLE 4 (ACCORDING TO THE INVENTION)—POLYMERIZATION OF VDC IN AQUEOUS EMULSION IN THE PRESENCE OF THE PMMA SEED LATEX PREPARED IN EXAMPLE 1

Example 2 was reproduced except that
the quantity of demineralized water introduced into the polymerization autoclave was 6.6 l;
the quantity of the PMMA seed latex (solid content of 34.0%) prepared according to the process as defined in Example 1 was 762 ml (corresponding to 11 g of dry matter/kg of monomers);
the quantity of demineralized water introduced into the premixer was 18.5 l;
the quantity of the sodium branched alkyl-($C_{12}$) diphenyloxide disulfonate solution containing 486 g/l of active material was 323 ml;

no sodium n-alkyl-($C_{10}$-$C_{13}$) benzene sulfonate solution containing 250 g/l of active material was added,
the quantity of the 2-acrylamido-2-methylpropane sulfonic acid sodium salt solution at 180 g/l was 1.24 l;
the quantity of methylmethacrylate was 1.48 kg; and
at To+1 min, 47.25 kg of the monomers emulsion were added from the premixer at a constant rate over 8 h.

The properties of the PVDC latex obtained in Example 4 were measured in the manner described previously. The results are given in Table 1.

Films were made with the PVDC latex obtained in Example 4. The properties measured on these films in the manner described above, are given in Table 2.

EXAMPLE 5—POLYMERIZATION OF VDC IN AQUEOUS EMULSION IN THE PRESENCE OF THE PMMA SEED LATEX PREPARED IN EXAMPLE 1

Example 2 was reproduced except that
the quantity of the PMMA seed latex (solid content of 34.0%) prepared according to the process as defined in Example 1 was 762 ml (corresponding to 11 g of dry matter/kg of monomers);
the quantity of demineralized water introduced into the premixer was 18.4 l;
the quantity of demineralized water introduced into the polymerization autoclave was 6.6 l;
the quantity of the sodium branched alkyl-($C_{12}$) diphenyloxide disulfonate solution containing 486 g/l of active material was 484 ml;
no sodium n-alkyl-($C_{10}$-$C_{13}$) benzene sulfonate containing 250 g/l of active material was added,
the quantity of the 2-acrylamido-2-methylpropane sulfonic acid sodium salt solution at 180 g/l was 1.24 l;
the quantity of methylmethacrylate was 1.48 kg; and
at To+1 min, 47.33 kg of the monomers emulsion were added from the premixer at a constant rate over 8 h.

The properties of the PVDC latex obtained in Example 5 were measured in the manner described previously. The results are given in Table 1.

Films were made with the PVDC latex obtained in Example 5. The properties measured on these films in the manner described above, are given in Table 2.

EXAMPLE 6(C) (COMPARATIVE)—POLYMERIZATION OF VDC IN AQUEOUS EMULSION IN THE PRESENCE OF THE PMMA SEED LATEX PREPARED IN EXAMPLE 1

Example 2 was reproduced except that
the quantity of the PMMA seed latex (solid content of 33.2%) prepared according to the process as defined in Example 1 was 781 ml (corresponding to 11 g of dry matter/kg of monomers);
the quantity of demineralized water introduced into the premixer was 17.6 l;
the quantity of the sodium branched alkyl-($C_{12}$) diphenyloxide disulfonate solution containing 486 g/l of active material was 484 ml;
no sodium n-alkyl-($C_{10}$-$C_{13}$) benzene sulfonate solution containing 250 g/l of active material was added,
the quantity of the 2-acrylamido-2-methylpropane sulfonic acid sodium salt solution at 180 g/l was 2.18 l;
the quantity of methylmethacrylate was 1.31 kg; and
at To+1 min, 47.33 kg of the monomers emulsion were added from the premixer at a constant rate over 8 h.

The properties of the PVDC latex obtained in Example 6 were measured in the manner described previously. The results are given in Table 1.

Films were made with the PVDC latex obtained in Example 6. The properties measured on these films in the manner described above, are given in Table 2.

EXAMPLE 7(C) (COMPARATIVE)—POLYMERIZATION OF VDC IN AQUEOUS EMULSION IN THE PRESENCE OF THE PMMA SEED LATEX PREPARED IN EXAMPLE 1

Example 2 was reproduced except that the quantity of the PMMA seed latex (solid content of 33.2%) prepared according to the process as defined in Example 1 was 781 ml (corresponding to 11 g of dry matter/kg of monomers);
the quantity of demineralized water introduced into the premixer was 19.1 l;
the quantity of the sodium branched alkyl-($C_{12}$) diphenyloxide disulfonate solution containing 486 g/l of active material was 1.08 l;
no sodium n-alkyl-($C_{10}$-$C_{13}$) benzene sulfonate solution containing 250 g/l of active material was added,
no 2-acrylamido-2-methylpropane sulfonic acid sodium salt solution at 180 g/l was added
the quantity of methylmethacrylate was 1.24 kg;
the quantity of methacrylonitrile was 1.29 kg;
the quantity of vinylidene chloride was 23.6 kg;
the temperature of the reaction medium was raised to 65° C.;
the addition of the 340 ml of the 71.3 g/l ammonium persulfate solution was made at T=64° C.; and
at To+1 min, 47.60 kg of the monomers emulsion were added from the premixer at a constant rate over 8 h.

The properties of the PVDC latex obtained in Example 7 were measured in the manner described previously. The results are given in Table 1.

Films were made with the PVDC latex obtained in Example 7. The properties measured on these films in the manner described above, are given in Table 2.

TABLE 1

| Examples | Solid content after adjustment if required (%) | z-average particle diameter $D_z$ (nm)/ polydispersity | Surface tension (mN/m) | pH |
| --- | --- | --- | --- | --- |
| 2 | 45.03 | 146/0.022 | 50.5 | 2.2 |
| 3 | 44.98 | 144/0.033 | 50.4 | 2.65 |
| 4 | 44.95 | 144/0.033 | 54.4 | 2.3 |
| 5 | 44.91 | 144/0.065 | 53.0 | 2.3 |
| 6(C) | 45.09 | 155/0.004 | 51.7 | 2.3 |
| 7(C) | 44.89 | 142/0.014 | 43.1 | 2.2 |

TABLE 2

| | Treatment before measurement | Example 2 | Example 3 | Example 4 | Example 5 | Example 6(C) | Example 7(C) |
|---|---|---|---|---|---|---|---|
| WVTr (g · μm/m² · day) | 2D40 | 9.2 | 10.5 | 8.9 | 8.2 | 8.5 | 8.1 |
| | 2D40 + pasteurized | 10.5 | 11.6 | 7.8 | 7.9 | 9.9 | 8.7 |
| | 2D40 + sterilized | 9.8 | 11.4 | 9.4 | 9.1 | 13.2 | 9.4 |
| OTr 23° C., 0% HR (cm³ · μm/m² · day · bar) | 2D40 | 8.5 | 8.2 | 7.7 | 7.8 | 8.5 | 8.4 |
| | 2D40 + pasteurized | 9.5 | 10.8 | 8.1 | 8.1 | 11.3 | 22.2 |
| | 2D40 + sterilized | 8.8 | 9.9 | 8.2 | 8.3 | 11.7 | 10.4 |
| OTr 23° C., 85% HR (cm³ · μm/m² · day · bar) | 2D40 | 9.5 | 15.4 | 9.3 | 9.1 | 12.1 | 9.9 |
| | 2D40 + pasteurized | 11.5 | 21.1 | 9.2 | 9.1 | 16.6 | 20.5 |
| | 2D40 + sterilized | 12.3 | 17.8 | 9.9 | 9.5 | 17.7 | 25.1 |
| Clarity (%) | 2D40 | n.d. | 91.7 | 93.1 | 93.2 | 93.1 | 90.5 |
| | 2D40 + pasteurized | n.d. | 86.6 | 92.8 | 92.5 | 91.4 | 89.8 |
| | 2D40 + sterilized | n.d. | 90.9 | 92.4 | 92.6 | 90.8 | 78.3 |
| Haze (%) | 2D40 | n.d. | 5.7 | 5.4 | 5.6 | 5.7 | 7.2 |
| | 2D40 + pasteurized | n.d. | >30 | 17.1 | 19.5 | >30 | 17.1 |
| | 2D40 + sterilized | n.d. | 9.6 | 16.0 | 17.9 | 26.4 | >30 | n.d.: non determined

From analysis of Table 2, it appears that the films made with latex according to the invention present less whitening after pasteurization or sterilisation and remain characterized by appropriate water vapor permeability and oxygen permeability to provide suffisant level of food protection.

The invention claimed is:

1. An aqueous latex (latex (L)) of a vinylidene chloride copolymer (copolymer (A)), wherein the copolymer (A) consists essentially of:
   recurring units derived from vinylidene chloride (VDC) in an amount comprised between 89.0 and 91.0 wt % of the copolymer (A),
   recurring units derived from methacrylonitrile (MAN) in an amount comprised between 2.00 and 5.50 wt % of the copolymer (A),
   recurring units derived from at least one ionic comonomer (ICO) in an amount comprised between 0.5 and 1.4 wt % of the copolymer (A), and
   recurring units derived from methylmethacrylate (MMA) in an amount such that the total of recurring units of VDC, MAN, ICO and MMA is 100 wt %,
   wherein the ionic comonomer is selected from the group consisting of 2-acrylamido-2-methyl-1-propane sulfonic acid sodium salt, sodium 2-sulfoethyl methacrylate, sodium 4-vinylbenzenesulfonate and mixtures thereof, and wherein the latex (L) comprises at least one surfactant (surfactant(S)) in an amount comprised between 0.09 and 1.50 wt % of the copolymer (A).

2. The aqueous latex (L) according to claim 1, wherein the recurring units derived from vinylidene chloride (VDC) are present in an amount of at least 89.2 wt % of the copolymer (A), and of at most 90.8 wt % of the copolymer (A).

3. The aqueous latex (L) according to claim 1, wherein the recurring units derived from methacrylonitrile (MAN) are present in an amount of at least 2.20 wt % of the copolymer (A), and of at most 5.25 wt % of the copolymer (A).

4. The aqueous latex (L) according to claim 1, wherein the recurring units derived from at least one ionic comonomer (ICO) are present in an amount of at least 0.6 wt % of the copolymer (A), and of at most 1.2 wt % of the copolymer (A).

5. The aqueous latex (L) according to claim 1, wherein the latex (L) comprises at least one surfactant (surfactant(S)) in an amount of at least 0.10 wt % of the copolymer (A), and in an amount of at most 1.40 wt % of the copolymer (A).

6. The aqueous latex (L) according to claim 1, wherein the copolymer (A) consists essentially of:
   recurring units derived from vinylidene chloride (VDC) in an amount comprised between 89.2 and 90.8 wt % of the copolymer,
   recurring units derived from methacrylonitrile (MAN) in an amount comprised between 2.20 and 5.25 wt % of the copolymer,
   recurring units derived from at least one ionic comonomer (ICO) in an amount comprised between 0.6 and 1.2 wt % of the copolymer (A), and
   recurring units derived from methylmethacrylate (MMA) in an amount such that the total of recurring units of VDC, MAN, ICO and MMA is 100 wt %,
   wherein the ionic comonomer is selected from the group consisting of 2-acrylamido-2-methyl-1-propane sulfonic acid sodium salt, sodium 2-sulfoethyl methacrylate, sodium 4-vinylbenzenesulfonate and mixtures thereof, and wherein the latex (L) comprises at least one surfactant (surfactant S in an amount comprised between 0.10 and 1.40 wt % of the copolymer (A).

7. The aqueous latex (L) according to claim 1, wherein the copolymer (A) consists essentially of recurring units derived from vinylidene chloride (VDC) in an amount of at least 89.5 wt % of the copolymer (A), and of at most 90.6 wt % of the copolymer (A).

8. The aqueous latex (L) according to claim 1, wherein the copolymer (A) consists essentially of recurring units derived from methacrylonitrile (MAN) in an amount of at least 2.50 wt % of the copolymer (A), and of at most 5.00 wt % of the copolymer (A).

9. The aqueous latex (L) according to claim 1, wherein the copolymer (A) consists essentially of recurring units derived from at least one ionic comonomer (ICO) in an amount of at least 0.7 wt % of the copolymer (A), and of at most 1.1 wt % of the copolymer (A).

10. The aqueous latex (L) according to claim 1, wherein the latex (L) comprises at least one surfactant-(surfactant(S)) in an amount of at least 0.12 wt % of the copolymer (A), and in an amount of at most 1.30 wt % of the copolymer (A).

11. The aqueous latex (L) according to claim 1, wherein the aqueous latex (L) is in the form of particles, and wherein the particles have a z-average particle diameter ($D_z$) of at least 120 nm and of at most 300 nm.

12. The aqueous latex (L) according to claim 1, wherein the aqueous latex (L) has a pH of from 2.2 to 2.65.

13. The aqueous latex (L) according to claim 1, comprising a polymethylmethacrylate seed latex.

14. A process for the manufacture of the aqueous latex (L) according to claim 1, characterized in that vinylidene chloride (VDC), methacrylonitrile (MAN), at least one ionic comonomer (ICO) and methylmethacrylate (MMA) are polymerized by radical polymerization in aqueous emulsion in the presence of at least one surfactant(S) in order to obtain the latex (L) comprised of the copolymer (A).

15. The process according to claim 14, characterized in that the polymerization takes place in the presence of a seed latex (seed latex (SL)).

16. The process according to claim 14, characterized in that the polymerization takes place in the presence of a methyl methacrylate polymer seed latex-(PMMA seed latex).

17. A method comprising coating the aqueous latex (L) according to claim 1 on a substrate to produce a multilayer film.

18. A film comprising the aqueous latex (L) according to claim 1.

19. The film according to claim 18, characterized in that it is comprised in food packaging.

20. A retort pouch comprising the film according to claim 19.

* * * * *